(12) United States Patent
Chiodini

(10) Patent No.: US 7,280,067 B2
(45) Date of Patent: Oct. 9, 2007

(54) RADAR DETECTOR AND RADAR DETECTING METHOD FOR WLAN SYSTEMS ACCORDING TO 802.11 WIRELESS COMMUNICATION STANDARDS

(75) Inventor: Alain Chiodini, Cagnes sur Mer (FR)

(73) Assignee: NewLogic Technologies GmbH, Lustenau (AU)

( * ) Notice: Subject to any disclaimer, the term of this patent is extended or adjusted under 35 U.S.C. 154(b) by 195 days.

(21) Appl. No.: 11/132,552

(22) Filed: May 19, 2005

(65) Prior Publication Data
US 2005/0270218 A1 Dec. 8, 2005

(30) Foreign Application Priority Data
Jun. 1, 2004 (DE) .................. 10 2004 026 943

(51) Int. Cl.
*G01S 7/40* (2006.01)
(52) U.S. Cl. .................. 342/20; 342/52; 342/194
(58) Field of Classification Search ............. 342/159, 342/20
See application file for complete search history.

(56) References Cited

U.S. PATENT DOCUMENTS

| 6,831,589 | B2 * | 12/2004 | Shearer, III ............... 342/20 |
| 7,024,188 | B2 * | 4/2006 | Khun-Jush et al. ......... 455/423 |
| 2003/0107512 | A1 * | 6/2003 | McFarland et al. ......... 342/159 |
| 2003/0206130 | A1 * | 11/2003 | Husted et al. ............ 342/57 |
| 2003/0214430 | A1 * | 11/2003 | Husted et al. ............ 342/57 |
| 2004/0033789 | A1 | 2/2004 | Tsien |
| 2004/0064493 | A1 | 4/2004 | Kulkami et al. |
| 2004/0132411 | A1 * | 7/2004 | Li ............................ 455/67.13 |
| 2004/0151137 | A1 * | 8/2004 | McFarland et al. ......... 370/329 |
| 2004/0156336 | A1 * | 8/2004 | McFarland et al. ......... 370/329 |
| 2004/0157580 | A1 * | 8/2004 | Stadelmeier et al. ....... 455/338 |
| 2005/0059363 | A1 * | 3/2005 | Hansen .................... 455/127.4 |
| 2005/0059364 | A1 * | 3/2005 | Hansen et al. ............ 455/127.4 |

FOREIGN PATENT DOCUMENTS

| DE | 203 19 526 | 5/2004 |
| DE | 20319526 U1 * | 5/2004 |
| EP | 1 515 488 | 3/2005 |
| JP | 2001285301 A * | 10/2001 |
| JP | 2001285301 | 10/2004 |
| WO | 03/001742 | 1/2003 |
| WO | 03/026218 | 3/2003 |

OTHER PUBLICATIONS

German Search Report dated Sep. 27, 2005 in corresponding German Application No. 10 2005 025 393.8.
United Kingdom Search Report dated Sep. 26, 2005 in corresponding United Kingdom Application No. GB0511170.3.

* cited by examiner

Primary Examiner—Thomas H. Tarcza
Assistant Examiner—Matthew M Barker
(74) Attorney, Agent, or Firm—Baker & Daniels LLP

(57) ABSTRACT

The present invention relates to a radar detector and a radar detecting method for WLAN systems according to 802.11 wireless communication standards, and particularly concerns the radar detection for 802.11 h dynamic frequency selection mechanism. The essence of the innovation consists in projecting the received phase vector on the signal subspace orthogonal to the expected radar pulse subspace and taking the norm of the resulting vector. The closer the norm is to zero, the more likely the received signal is to be a radar pulse. The invention is able to detect both, sinusoidal radar signals and chirp-like radar signals.

8 Claims, 2 Drawing Sheets

RADAR DETECTOR AND RADAR DETECTING METHOD FOR WLAN SYSTEMS ACCORDING TO 802.11 WIRELESS COMMUNICATION STANDARDS

FIELD OF THE INVENTION

The present invention relates to a radar detector and a radar detecting method for WLAN systems and particularly concerns the radar detection for 802.11h dynamic frequency selection mechanism.

BACKGROUND OF THE INVENTION

The wireless 802.11h communication standard, which is an extension of the 802.11a standard, is designed to meet European regulations regarding the use of the 5 GHz band by ensuring that WLAN systems operating in this band do not interfere with military radars and other users of the frequency band. Two mitigation technologies are provided with that purpose in mind:

Dynamic Frequency Selection (DFS):
Transmit Power Control (TPC).

The previous radar detector implemented in WLAN systems was solely based on the detection (power-wise) of a single short pulse and is expected to yield a relatively high rate of false alarm when performance assessment occurs. This scheme, which comes within the framework of the AGC (automatic gain control) procedure, uses the power measurements provided by the RSSI block to make a decision about whether a short pulse has been received and is likely to trigger upon the reception of any type of pulse-like signal without discrimination (there actually exist radar-like short pulses or bursts, which may result from either external parasitic noise, packet collision from WLAN stations operating in the same channel or WLAN activity in adjacent channels).

The problem to be solved comes within the framework of DFS and is concerned with the successful detection of co-channel radar signals by an 802.11h station in order to prevent any disruptions of the radar station nominal functioning by means of a subsequent channel change.

The radar detection scheme has to be highly reliable, as any false alarm would result in an 802.11h receiver station non-occupying the radar-flagged channel for 30 minutes.

What types of signals should we be able to detect? The military is actually all but generous when it comes to informing the rest of the community about the features of the fancy signals emitted by their radar stations. However, despite the secrecy surrounding military radars, it is generally admitted that radar signals broadly fall into either one of the two following categories:

Pulsed waveforms (pulse repetition frequency), which are made of trains of time-spaced pulses emitted at regular time intervals, Continuous waves (frequency modulated continuous wave) whose instantaneous frequency varies according to a periodical pattern, the most commonly used one being the linear chirp.

The ETSI, which has initiated a regulation effort regarding these matters, wrote a document describing certain characteristics of the radar signals encountered in Europe, which actually emphasizes the first category described above. So, as far as we are concerned and as a starting point, we have taken for granted the information provided by the ETSI material we could lay our hands on and have therefore decided to restrict ourselves to the detection of pulse waveforms only. These radar pulses are assumed to:

Be either sinusoidal or chirp-like,
Abruptly start and finish power-wise,
Have a width of either 1 or 2 µs,
Have a repetition rate of either 330, 700 or 1800 per second.

SUMMARY OF THE INVENTION

It is the objective of the present invention to provide a radar detector and a radar detecting method for WLAN systems according to 802.11 wireless communication standards which considerably reduces the rate of error detections without degrading the detection rate.

This object is achieved by providing a radar detector and a radar detecting method as described in the independent claims.

Other features which are considered to be characteristic for the invention are set forth in the dependent claims.

In terms of objectives, we seek to achieve the following things:

Detect the presence of any radar operating in the channel of interest in a quiet period, Assert that the radar is up and running upon processing a single pulse, Have a low rate of false alarm, Integrate the radar detection with the normal 802.11a packet detection procedure.

Compared to the prior art solutions the new solution goes one step further as it processes any received pulse in order to determine the nature of the received signal and decide whether it would make it a radar signal according to our standards. This new scheme still takes root in the AGC procedure but now requires that both ADCs be switched on while radar search mode is activated. From a theoretical standpoint, the essence of the innovation consists in projecting the received phase vector on the signal subspace orthogonal to the expected radar pulse subspace and taking the norm of the resulting vector. The closer the norm is to zero, the more likely the received signal is to be a radar pulse.

However, from a practical standpoint, it is easier to calculate a scalar product between the received phase vector and a fitted model of it.

DESCRIPTION OF A PREFERRED EMBODIMENT OF THE INVENTION

Figure 1:
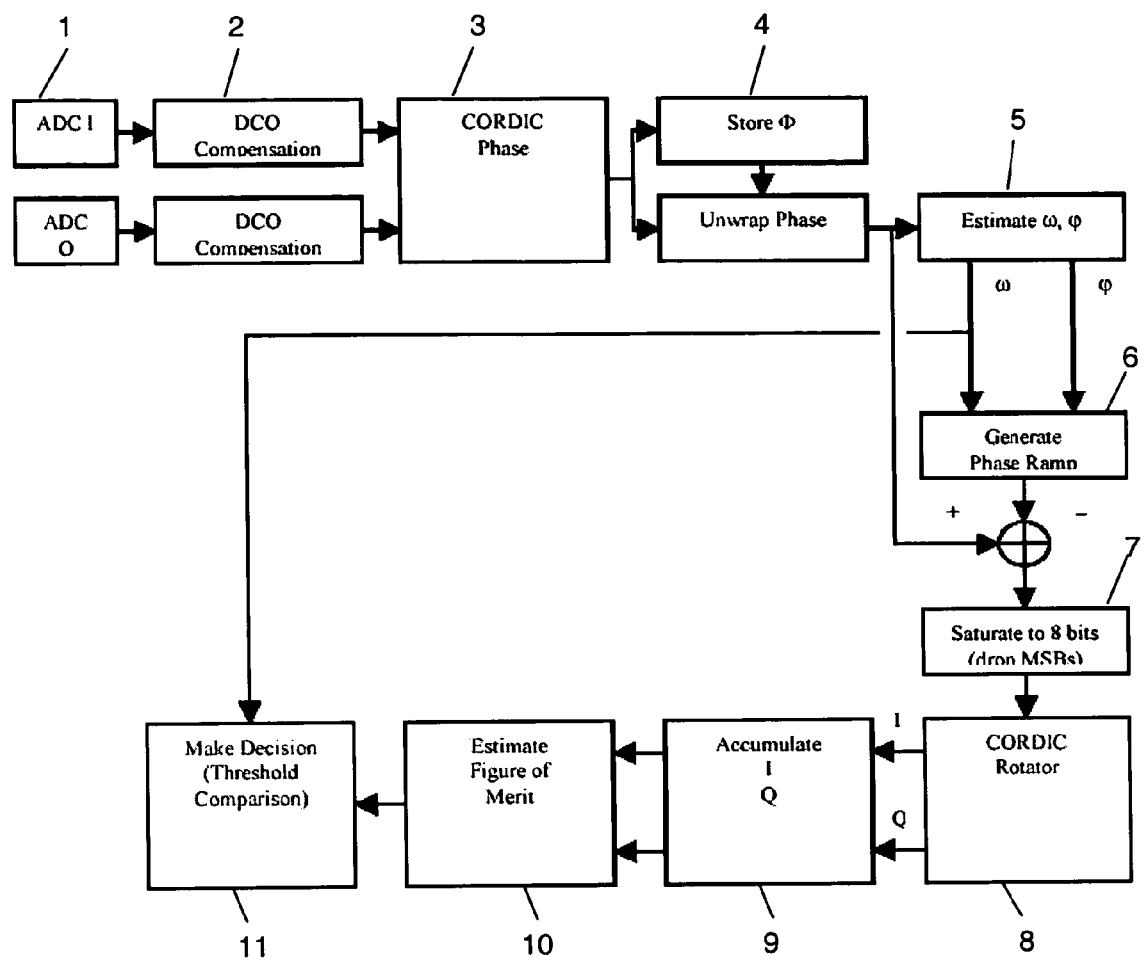
FIG. 1 shows a block diagram of the sinusoidal radar detector.

Two schemes are available depending on the nature of the received radar pulse:

a. Sinusoidal Pulse Detector:

The sinusoidal radar detector of FIG. 1 is based on the fact that any sinusoidal function is fully characterized by two parameters phase-wise:

Its angular frequency,
Its initial phase.

Hence, the phase model for the sinusoidal pulse is an affined line whose slope and intersection with the phase axis respectively correspond to the angular frequency and initial phase just mentioned. In a nutshell, once a ramp up detection occurs (because a considerable signal is present in the frequency band), a short sample of the incoming signal is acquired and DC offset compensated. In a preferred implementation, thirty two (32) 60-MHz samples of I- and Q signals are captured and converted by analog-to-digital converters (Block 1) to digital signals. A coarse estimate of the DC offset is available thanks to a digital RSSI block (usually present in a WLAN receiver) where a DC offset compensation is performed (Blocks 2), The signal is then fed to the radar detector. The actual phase $\Phi$ of the received signal is determined by means of a CORDIC (COordinate Rotation DIgital Computer) (Block 3) and unwrapped (Blocks 4). The determination of the phase model parameters, i.e. the angular frequency $\omega$ and initial phase $\phi$ ensues. The calculation of the angular frequency $\omega$ and initial phase $\phi$ is achieved through the minimization of a cost function in the least square sense and their computation boils down to that of a couple of dot products (Block 5). The corresponding phase ramp is reconstructed (Block 6) and subtracted from the actual phase signal $\Phi$. The resulting phase difference along with a constant value is saturated to an 8-bit signal (Block 7) and feeds a CORDIC rotator (Block 8) in order to generate a complex exponential signal (I and Q) whose samples are eventually accumulated (Block 9). The CORDIC rotator performs a rotation using a series of specific incremental rotation angles selected so that each is performed by a shift and add operation. A figure of merit is then calculated by simply taking the absolute value of the resulting sum (Block 10). The figure of merit basically measures the overall phase distance between actual and ideal phase signals. A decision regarding the nature of the incoming signal is finally made by comparing the figure of merit and the angular frequency estimate to a couple of predefined thresholds (Block 11).

b. Chirp-Like Pulse Detector:

The chirp-like pulse detector is simply an extension of the sinusoidal pulse detector described above. It relies on the very same principle except for the fact that any chirp function needs at least three parameters to be characterized phase-wise as the phase model is no longer a linear one. From a practical standpoint, this translates into the fact that at least one more dot product needs to be calculated during the signal processing stage.

Figure 2:
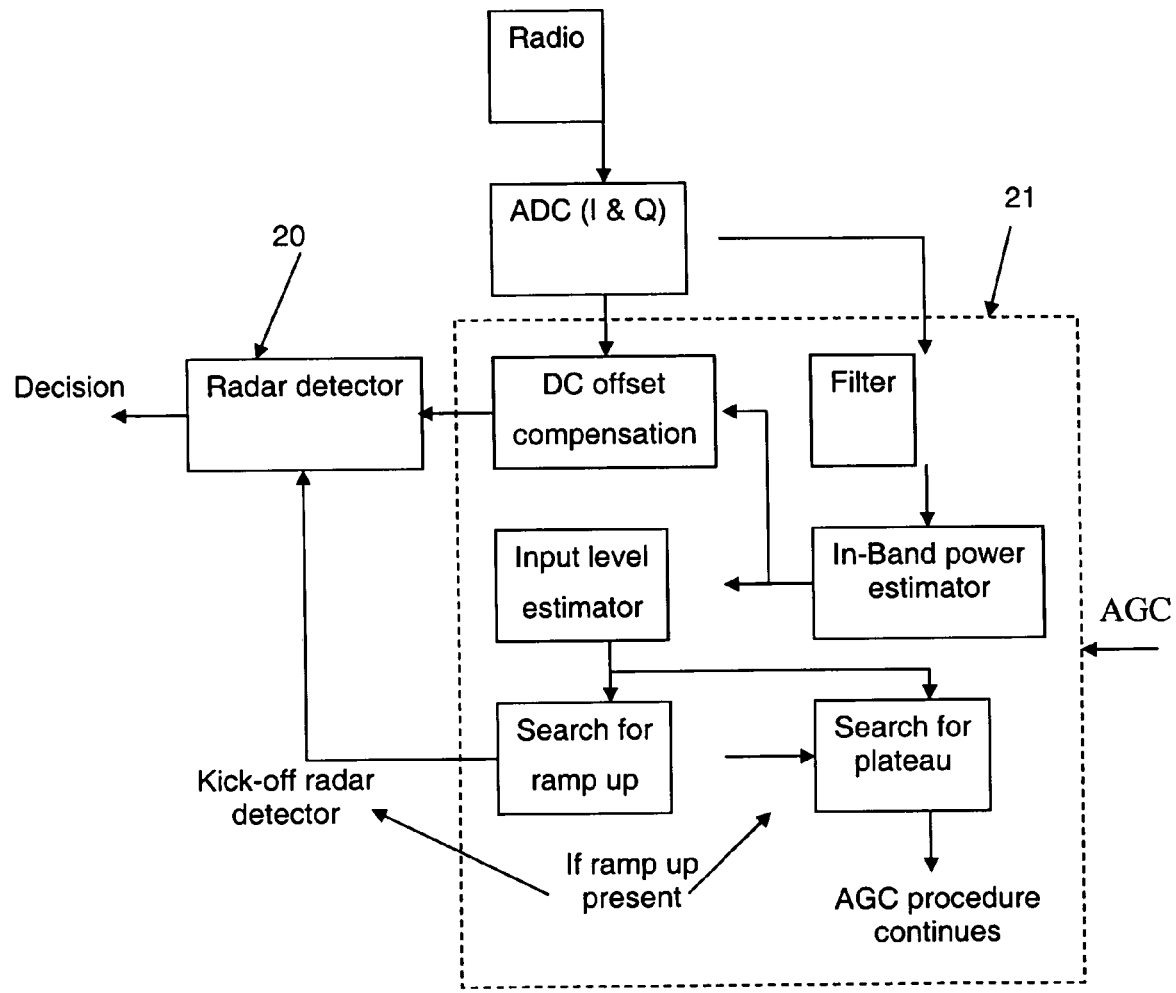
FIG. 2 shows a block diagram of a radar detector using functional parts of a automatic gain control (AGC) circuit of a WLAN receiver.

FIG. 2 is a block diagram of a radar detector (Block 20) using functional parts of an automatic gain control (AGC) circuit (Block 21) of a WLAN receiver. The AGC provides a digital and phase compensated signal (I and Q) which is fed to the radar detector (Block 20). The AGC also provides a "kick-off" signal to the radar detector whenever a ramp up of the incoming signal is detected.

The radar detector according to the present invention considerably improves the false alarm rate without degrading the detection rate.

The invention claimed is:

1. Apparatus for the use in WLAN systems according to 802.11 wireless communication standards, comprising a radar signal detector, wherein said radar signal detector comprises means for determining the actual phase $\Phi$ of a received signal, means for calculating the angular frequency $\omega$ and initial phase $\phi$ from the actual phase signal, means for determining the phase ramp corresponding to the angular frequency and initial phase and for calculating a difference signal $\Phi$-$\phi$ by subtracting the initial phase from the actual phase, means for generating a complex exponential signal, I and Q, from the difference signal, means for calculating a figure of merit from the complex exponential signal, and means for making a decision regarding the nature of the incoming signal by comparing the figure of merit and the angular frequency estimate $\omega$ to a couple of predefined threshold values.

2. A method for detecting signals in WLAN systems wherein radar signals are detected, said method comprising the steps of: capturing a number of samples of received I- and Q signals, converting the signals to digital I- and Q signals, performing a DC offset compensation on the digital signals, determining the actual phase $\Phi$ of the digital signal, determining the angular frequency $\omega$ and initial phase $\phi$ of the signal, reconstructing the phase ramp corresponding to the angular frequency and initial phase, calculating a difference signal $\Phi$-$\phi$ by subtracting the initial phase from the actual phase, generating a complex exponential signal, I and Q, and accumulating its values, calculating a figure of merit by taking the absolute value of the resulting sum, making a decision regarding the nature of the incoming signal by comparing the figure of merit and the angular frequency estimate $\omega$ to a couple of predefined threshold values.

3. The method according to claim 2 wherein sinusoidal radar signals are detected.

4. The method according to claim 2 wherein chirp-like pulsed radar signals are detected.

5. The method according to claim 2, including the step of projecting the received phase vector on the signal subspace orthogonal to the expected radar pulse subspace and taking the norm of the resulting vector.

6. The method according to claim 3, wherein chirp-like pulsed radar signals are detected.

7. The method according to claim 3, including the step of projecting the received phase vector on the signal subspace orthogonal to the expected radar pulse subspace and taking the norm of the resulting vector.

8. The method according to claim 4, including the step of projecting the received phase vector on the signal subspace orthogonal to the expected radar pulse subspace and taking the norm of the resulting vector.

* * * * *

UNITED STATES PATENT AND TRADEMARK OFFICE
CERTIFICATE OF CORRECTION

PATENT NO. : 7,280,067 B2  Page 1 of 1
APPLICATION NO. : 11/132552
DATED : October 9, 2007
INVENTOR(S) : Alain Chiodini It is certified that error appears in the above-identified patent and that said Letters Patent is hereby corrected as shown below:

Claim 1, Column 4, Lines 6-7

Delete "according to 802.11 wireless communication standards"

Signed and Sealed this

Twenty-sixth Day of August, 2008

JON W. DUDAS
*Director of the United States Patent and Trademark Office*